Patented June 3, 1941

2,244,558

UNITED STATES PATENT OFFICE 2,244,558

FLUORESCENT MATERIAL

Erich Krautz, Berlin-Charlottenburg, Germany, assignor to General Electric Company, a corporation of New York No Drawing. Application January 22, 1938, Serial No. 186,485. In Germany February 8, 1937

3 Claims. (Cl. 176—122)

The present invention relates to fluorescent materials generally and more particularly the invention relates to such materials which transform visible rays of short wave length and invisible rays into visible rays of long wave length, such as red rays, and which are useful for supplementing and complementing the light emitted by gaseous electric discharge lamp devices, such as mercury vapor discharge lamps.

I have observed that many of the materials of this character now known in the art have a high rate of depreciation, that is, the light output of such materials diminishes rapidly when irradiated by light of short wave length or when exposed to air for an appreciable time or when heated. These characteristics are disadvantageous particularly when such materials are used in locations in which they are exposed to the weather or when they are exposed to reducing atmospheres at elevated temperatures. Hydrogen and dust have a reducing effect when such materials are at elevated temperatures.

The object of the present invention is to provide a heat resisting fluorescent material emissive in the red spectral ranges which has a long useful life. Another object of the invention is to provide a fluorescent material which is substantially unaffected by exposure to air, hydrogen or dust when at elevated temperatures. A further object of the invention is to provide a method of producing such material. Still further objects and advantages attaching to the invention will be apparent to those skilled in the art from the following particular description.

I have discovered that a mixture of magnesium oxide and titanium dioxide sintered together by methods used in the ceramic art emits red light having a wave length of about 6800 to 7100 Å. when irradiated by rays of short wave length. I have discovered further that the fluorescent material should have at least 2% by weight of titanium dioxide and not more than 53% of this material. While neither of the materials magnesium oxide or titanium dioxide alone are emissive in the red spectral range when irradiated by light of short wave length I have demonstrated that a mixture of such materials is emissive in this range when so irradiated. Preferably the mixture is prepared by mixing these two materials together and milling the mixture when moist. The liquid is then removed by filtering and drying and the mass is formed into the desired shape by ceramic methods. The bodies thus formed are then sintered at a temperature higher than 1000° C. and preferably at a temperature of between 1400° C. and 1550° C. Preferably the mixture consists of about 15% to 44% titanium dioxide and about 56% to 85% magnesium oxide.

I believe that the fluorescence of this material is due to the formation of magnesium ortho-titanate having a spinel structure. Preferably the content of titanium dioxide is restricted to an amount such that the formation of ortho-titanate takes place. I have observed that the light output of the material is then at a maximum. At least 2% of titanium dioxide is preferred because the red light emitted by the material is too weak in intensity when less of this material is used.

It will be noted from the foregoing that the fluorescent substance of this invention is a ceramic material and accordingly it possesses all the advantages characteristic of such materials which are of great physical strength at room temperature and at temperatures in excess of room temperature. I have demonstrated that the fluorescent material of the present invention and the bodies of desired shape made from such material may be heated to red heat in air or in a vacuum without any loss in light output at room temperature. I have demonstrated further that such bodies may be heated to a temperature of about 300° C. for over one hour in a reducing atmosphere, such as hydrogen, without any deleterious effect on the light output thereof.

The new fluorescent material does not absorb the red light emitted thereby, as is the case with natural or artificial ruby. Tubes and plates of the new fluorescent material are translucent, have a high transmission characteristic for visible light and do not change the color of the visible light passing through such material even when the material is emitting light.

Ceramic bodies of any shape such as rods, tubes or plates are easily fabricated. The tubes and plates are useful as closure plates or other parts of gaseous electric discharge lamp devices, particularly mercury vapor discharge lamps, since the material is impervious to gas and may be fused directly to the usual glass containers of such devices without the use of special sealing glasses. When desired the material is used in powder form and is mounted in light receiving relation to the gaseous electric discharge in the lamp device, for example, the powder may be placed on the inner surface or the outer surface of the containers of such devices, or on the surface of heat conservators associated with said devices or on screens for such devices. The fluorescent material may be applied to such surfaces by methods now known in the art, such as by using a binding material such as phosphoric acid onto which the pulverized fluorescent material is dusted.

I have demonstrated that a slight addition, such as 1 to 5% of beryllium oxide enhances the translucency of the ceramic body made of the fluorescent material of the invention. When desired small admixtures of materials may be used to increase the light output of the fluorescent material, for example, 0.001% of chromic oxide has this effect.

What I claim as new and desire to secure by Letters Patent of the United States, is:

1. In combination, a gaseous eelctric discharge lamp device and a fluorescent material mounted in light receiving relation to the discharge in said device, said fluorescent material emitting light in the red spectral regions under excitation by radiation from said discharge, said fluorescent material consisting of the product of sintering a mixture consisting of about 1 to 5 percent of beryllium oxide, magnesium oxide and titanium dioxide in which the titanium dioxide content is at least 2 percent and not more than 53 percent by weight of the total content of magnesium oxide and titanium dioxide.

2. In combination, a gaseous electric discharge lamp device and a fluorescent material mounted in light receiving relation to the discharge in said device, said fluorescent material emitting light in the red spectral regions under excitation by radiation from said discharge, said fluorescent material consisting of the product of sintering a mixture comprising about 1 to 5 percent of beryllium oxide, about 0.001 percent of chromic oxide, magnesium oxide and titanium dioxide in which the titanium dioxide content is at least 2 percent and not more than 53 percent by weight of the total content of magnesium oxide and titanium dioxide.

3. In combination a gaseous electric discharge lamp device and a fluorescent material mounted in light receiving relation to the discharge in said device, said fluorescent material emitting light in the red spectral regions under excitation by radiation from said discharge and consisting of the product of sintering a mixture comprising about 0.001 percent of chromic oxide, magnesium oxide and titanium dioxide in which the titanium dioxide content is at least 2 percent and not more than 53 percent by weight of the total content of magnesium oxide and titanium dioxide.

ERICH KRAUTZ.